United States Patent [19]
Minot et al.

[11] Patent Number: 5,455,892
[45] Date of Patent: Oct. 3, 1995

[54] METHOD FOR TRAINING A NEURAL NETWORK FOR CLASSIFYING AN UNKNOWN SIGNAL WITH RESPECT TO KNOWN SIGNALS

[75] Inventors: Joël Minot, Charenton; Philippe Gentric, Paris, both of France

[73] Assignee: U.S. Philips Corporation, New York, N.Y.

[21] Appl. No.: 904,734

[22] Filed: Jun. 25, 1992

[30] Foreign Application Priority Data

Jun. 28, 1991 [FR] France .................. 91 08066

[51] Int. Cl.$^6$ .................................. G06F 15/18
[52] U.S. Cl. .................. 395/23; 395/21; 395/22; 395/27
[58] Field of Search .................. 395/21, 22, 23, 395/24, 25, 27; 382/1314 15, 38, 43

[56] References Cited

U.S. PATENT DOCUMENTS

| | | | |
|---|---|---|---|
| 5,092,343 | 3/1992 | Spitzer et al. | 395/22 |
| 5,153,923 | 10/1992 | Matsuba et al. | 382/14 |
| 5,179,596 | 1/1993 | Weingard | 395/25 |
| 5,214,745 | 5/1993 | Sutherland | 395/22 |
| 5,259,039 | 11/1993 | Akamatsu | 395/22 |
| 5,274,714 | 12/1993 | Hutcheson et al. | 382/15 |
| 5,333,209 | 7/1994 | Sinden et al. | 382/13 |
| 5,343,251 | 8/1994 | Nafeh | 395/22 |

OTHER PUBLICATIONS

Sato et al., "Online Signature Verification Based on Shape, Motion, and Writing Pressure, Proceeding of 6th International Conference on Pattern Recognition", Munich, 1982, pp. 823–826.

Lucas et al., "Signature verification with a syntactic neural net"; IJCNN, pp. 373–378 vol. 1 17–21 Jun. 1990.

Sabourin et al, "Off–line signature verification using directional pdf and neural networks"; Proceedings. 11th IAPR, pp. 321–325, 30 Aug.–3 Sep. 1992.

Higashino, "Signature verification system on neuro–computer"; 11th IAPR, pp. 517–521, 30 Aug. –3 Sep. 1992.

P. A. Jokinen, "Neural Networks with Dynamic Capacity Allocation & Quadratic Function Neurons", Proceedings of Neuronimes, 1990, pp. 351–363.

Siu et al, "Decision Feedback Equalization using neural network structures"; First IEEE Conf. on Artificial Neural Networks; 16–18 Oct. 1989, pp. 125–128.

E. Alpaydin, "Grow–and–Learn: An Incremental Method for Category Learning", International Neural Network Conference INNC–90 Paris, vol. 2, Jul. 9, 1990, pp. 761–764.

D. Lowe et al., "Exploiting Prior Knowledge in Network Optimization: An Illustration From Medical Prognosis", Network—Computation in Neural Systems, vol. 1, No. 3, Jul. 3, 1990, pp. 299–323.

Primary Examiner—Allen R. MacDonald
Assistant Examiner—Tariq Hafiz
Attorney, Agent, or Firm—Anne E. Barschall

[57] ABSTRACT

The device includes a neural network with an input layer 3, an internal layer 4, and an output layer 5. This network is designed to classify data vectors to classes, the synaptic weights in the network being determined through programming on the basis of specimens whose classes are known. Each class is defined during programming as corresponding to a set of neurons of which each represents a domain which contains a fixed number of specimens. The network includes a number of neurons and synaptic weights which have been determined as a function of the classes thus defined.

7 Claims, 3 Drawing Sheets

METHOD FOR TRAINING A NEURAL NETWORK FOR CLASSIFYING AN UNKNOWN SIGNAL WITH RESPECT TO KNOWN SIGNALS

The invention relates to a method of classifying data vectors into one or several classes by means of a neural network having several layers, whereby the synaptic coefficients or weights for obtaining the desired classification are determined by trained on the basis of differences between training specimens of which the class is known, the dimension of the network being adapted so as to fit the number of specimens and classes trained.

The invention also relates to a device for classifying data presented in the form of data vectors, which device provides a value representing an estimated probability that a data vector belongs to a class from one or several classes which have been trained by means of differences between training specimens, and which comprises a neural network with several layers for processing a data vector.

An example to be classified, which example is defined by a set of data, is considered as a "data vector" in a hyperspace, the coordinates of this vector being the values of the data of the example. The word "specimen" will be used below for indicating a particular difference vector such as defines a training specimen (the device "learns" to define a class in that it is provided with training specimens forming part of this class).

The invention particularly relates to the verification of signatures, but it is clear that it is also applicable inter alia in fields in which the available data for training of the device are limited in number (fusion of data, signal detection) or when a problem is present regarding the classification into one class (such as estimating the probability or detecting a signal in noise), or when there is an evolution in time (ageing). Other examples of the field of application of the invention may be speech recognition and written-character recognition.

A neural device of this type is known from the article: "Neural networks with dynamic capacity allocation and quadratic function neurons", by Petri A. Jokinen in "Proceedings of Neuronimes", 1990, pp. 351–363. The device operates with coefficients of a covariance matrix. The neurons are capable of performing squaring operations which is accordingly cumbersome to realize.

One of the problems in the field of authenticating signatures is that there is only a single class of training specimens: that of the genuine signatures. It is therefore not obvious how to distinguish between authentic signatures and forged signatures for which of course no typical specimen is available. Accordingly, the invention has as an object to provide a method that resolves this problem and that can be implemented in a simple neural-net-like device of the so-called MLP type ("Multi Layer Perceptron").

These objects are achieved in the method of the invention as specified in claim 1. Decision domains are sought which contain a fixed number of training specimens instead of seeking decision domains which are defined by the boundaries of their influence zones (as is the case with the known algorithm for programming by backpropagation). A decision domain is defined as a domain in which the device makes the same classification decision for all difference vectors present therein.

Among other things, the learning mechanism does not operate iteratively and therefore can be very fast. In addition, the method supports incremental learning, that is, supplementary specimens can be learned without having to reconsider the previously learned specimens.

A device according to the invention is characterized in that it comprises a number of neurons and synaptic weights which have been determined by the method according to the invention.

The neural device according to the invention thus utilizes a training method which is based on statistical behaviour for classifying the data.

In such a device, the neural network having three layers: an input layer, an internal layer, and an output layer, the weights of the connections between the input layer and the internal layer are advantageously equal to coefficients $a_{ij}$ and $b_i$ in the equation:

$$\sum_{ij} x_i a_{ij} x_j + \sum_i x_i b_i - c < S$$

in which S is a previously determined coefficient which is an indication of the volume assigned to the domain considered, the coefficients "$a_{ij}$", "$b_i$", and "c" being determined through identification with the relation:

$$L(X) = -(X-\mu)^T \Gamma^{-1}(X-\mu) - \ln|\Gamma|$$

in which X is the vector of coordinates of the training specimen that is being considered, $L(X)$ is defined by $L(X)<S$, T is a mathematical operator indicating that the vector $(X-\mu)$ is transposed, $\mu$ is the centre of the said distribution and $\Gamma$ is the covariance matrix of the said distribution.

Advantageously, each output neuron being connected to internal neurons corresponding to difference between training specimens of one class, the device comprises a neuron whose value is fixed at "−1", which is connected to all output neurons, and whose synaptic weight as regards the connection to each output neuron is adapted by the presentation to the network of differences between training specimens of one class after the definition of the groups of internal neurons corresponding to the classes, and by successively testing different weights between the neuron whose value is fixed at "−1" and the output neuron corresponding to the class in such a manner as to ascertain the weight which minimizes the mean error for the class, which process is repeated for each of the classes.

In order to provide the data required for the neural network, the device in addition advantageously comprises an input module which adds to the input specimen vector a difference vector whose components are two-by-two products of the components of the input specimen vector, which module accordingly replaces n terms by $n+n(n+1)/2$ terms, each provided at one output, which outputs are each connected to one of the neurons of the first layer of neurons.

Finally, a signature verification device will exhibit an improved performance when it comprises a device according to the invention.

The following description with reference to the annexed drawings referring to non-limitative examples will give a clear understanding of how the invention may be put into practice.

Figure 1:
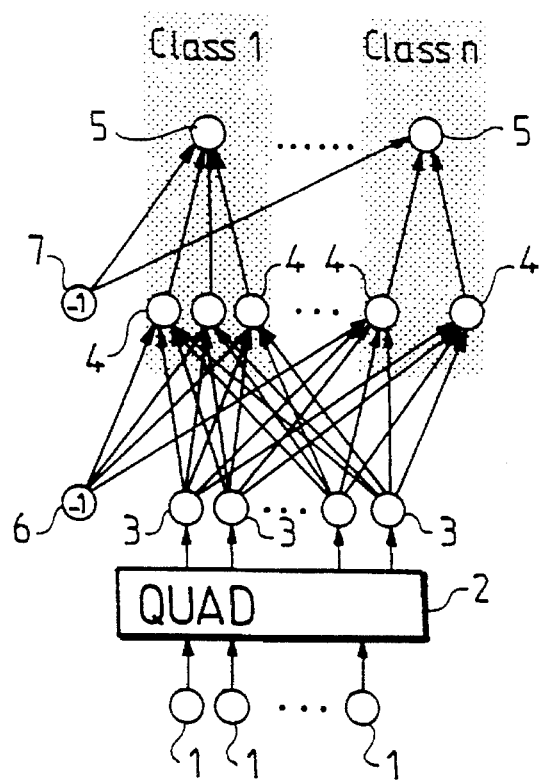
FIG. 1 shows a neural network according to the invention.

The invention provides a method and an apparatus for classification or authentification of a particular signal, such as a signature, by correlating it to test signals. Correlation is performed on the basis of typical features of the signal's pattern. For a signature, for instance, shape, writing pressure and temporal aspects, such as the time to complete the signature, may be the typical features to be taken into account.

Once the typical features are extracted from the test signals, the features are used to create one or more parameter sets, each whereof is representative of a Gaussian probability distribution (Gaussian) in the feature space. More specifically, each respective parameter set comprises a respective covariance matrix and a respective centroid.

The test signals may comprise one or more classes, a class being defined as a set of test signals whose typical features are considered mutually equivalent. Each class may be represented by a single Gaussian or may be split up into two or more Gaussians. If a collection of test signatures show equivalent features, the test signatures are considered to be of a single individual. If upon correlating the test signatures and another signature it is found that the latter has features equivalent to the former, then the other signature is considered to be of the same class as the test signatures.

Each Gaussian is specified by a quadratic function involving a covariance matrix and a centroid. For a given value of the quadratic function, the Gaussian has an associated value and can be visualized by a specific ellipsoid in the feature space. For different values of the Gaussian there are different, concentric ellipsoids. The volume integral of the Gaussian over the inner region of a particular ellipsoid is the value for the probability that a randomly chosen point lies within this region. This probability may be interpreted as a degree of acceptability. For instance, a randomly chosen point that lies within the ellipsoid of 0.8 is accepted for some purpose, whereas another randomly chosen point outside the 0.8 ellipsoid is discarded for that purpose.

Calculating the value of the quadratic function for a particular point therefore is an essential step to determining whether or not this point is acceptable. The point is represented by coordinates in the feature space. The value of the quadratic function in the invention is calculated by first preparing a vector having components that are squares of the coordinates, products of two different coordinates, and the coordinates themselves. Then each of these components is multiplied by the correct one of the parameters that specify the quadratic function. Finally the results of the multiplications are summed. The outcome is the value of the quadratic function.

Preferably, this multiplying and summing is done by means of a neural net, since a neural net is based upon and optimized for these basic operations. Then, the Gaussian parameters function as the synaptic coefficients, and the components introduced in the previous paragraph are the input signals to the neural net.

The following description refers to the verification of signatures by way of example, consisting in finding a probability that a sample (a signature to be verified) belongs to a class which has been defined by other samples (a group of authentic signatures called "specimens" which have been previously provided). It should be noted, however, that the device may alternatively be used for activities other than the verification of signatures, as has been indicated in the introductory section.

The hand-written signature is one of the most common methods of identifying individuals. There are two groups of methods and of devices for the analysis and verification of signatures, i.e. for determining whether a signature is authentic or whether it is counterfeit:

methods examining a signature previously written on a document and regarded as a shape to be analysed;

methods by which the writing process of the signature is analysed while the signature is being written.

The former category has until now been found to be unsuitable for a reliable automatic verification. The invention accordingly relates to a device based on the second category.

A writing-pad is used on which the paper receiving the signature is placed. This pad (which does not form part of the invention) is provided with pressure transducers which at each and every moment transmit the position (for example, coordinates x, y) and the application force of the pen on the paper. Samples of these various quantities are registered at regular intervals. The set of values for each quantity in question forms the coordinates of a vector in a hyperspace. These values are subsequently normalized. The normalization provides data which are independent of the total time used for realising the signature, of its general position on the pad, of its inclination relative to the horizontal, and of its general size.

The device measures the difference between a signature B to be analysed and the specimens of authentic signatures A which have been registered during programming.

This difference is expressed by a set of distances $d(B, A)$: $d(B,A)=|z_B^*(t)-z_A^*(t)|$, in which $z_B^*(t)$ and $z_A^*(t)$ are vectors corresponding to the signature B and to one of the signatures A, respectively. The distance is a scalar one. There are as many distance as there are signatures A.

The distance thus defined is unfortunately sensitive to instantaneous fluctuations in the writing speed, which are different from one signature to the other for one and the same person. This is accordingly corrected through the introduction of a "time warping function" which is determined by known means so as to minimize $d(B,A)$. The kind of time warping which has been necessary for minimizing the distance is itself a significant data concerning the difference between two signatures. For more details on these normalization techniques and on the time warping function, the reader is referred, for example, to the article by Yukio Sato and Kiyoshi Kogure "Online signature verification based on shape, motion, and writing pressure" in Proceedings of 6th International Conference on Pattern Recognition, Munich (1982), pp. 823, 826.

In the final analysis, three significant distances can be retained as the distances between a vector representing a signature A from the set of authentic signatures and the vector representing a signature B to be verified. These three distances relate to:

the position of the pen (normalized and corrected through time warping)

the application pressure of the pen (normalized and corrected by time warping simultaneously with the correction for the position)

the warping function for the time itself.

These three distances themselves constitute a vector of three dimensions which expresses the difference between the signatures. It would also be possible to register in addition, for example, the approximate time required for realising the signature and/or any other parameter, which would lead to a vector of four dimensions or more. There are as many of these vectors as there are specimens of authentic signatures corresponding to one given signature B.

The neural device of FIG. 1 processes a vector which is applied to the inputs 1. The coordinates of this vector are processed in an input module 2 which will be called "quadrature member" and which will be described further below. This quadrature member 2 comprises outputs which are connected to neurons 3 of a first layer, the input layer, of which the neurons will be called "quadratic neurons". Each neuron of this layer is connected to all neurons of a second internal layer of neurons 4, which will be called "hyperellipsoidical neurons". The neurons of this layer are subdivided into groups of which each corresponds to one class of the classification to be achieved, and the neurons of one group are connected to one output neuron 5. Finally, two neurons 6 and 7 are present, one connected to all hyperellipsoidal neurons and the other to all output neurons. The role of these neurons 6 and 7 will be explained further below.

Figure 2:
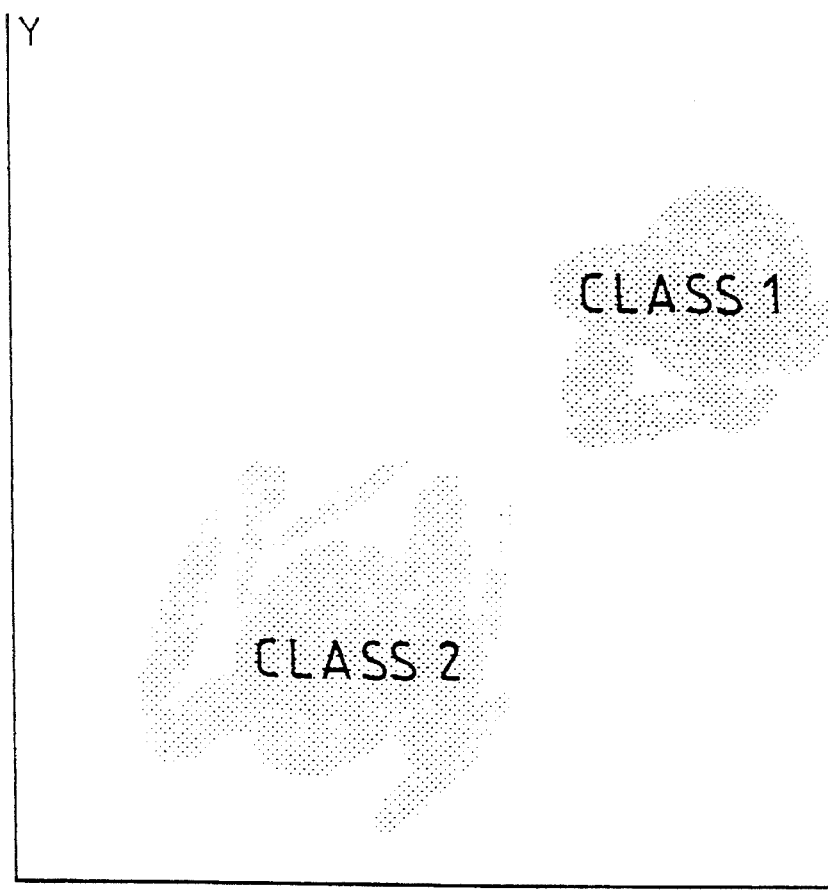
FIG. 2 illustrates clusters of samples subdivided into two classes.
Figure 3:
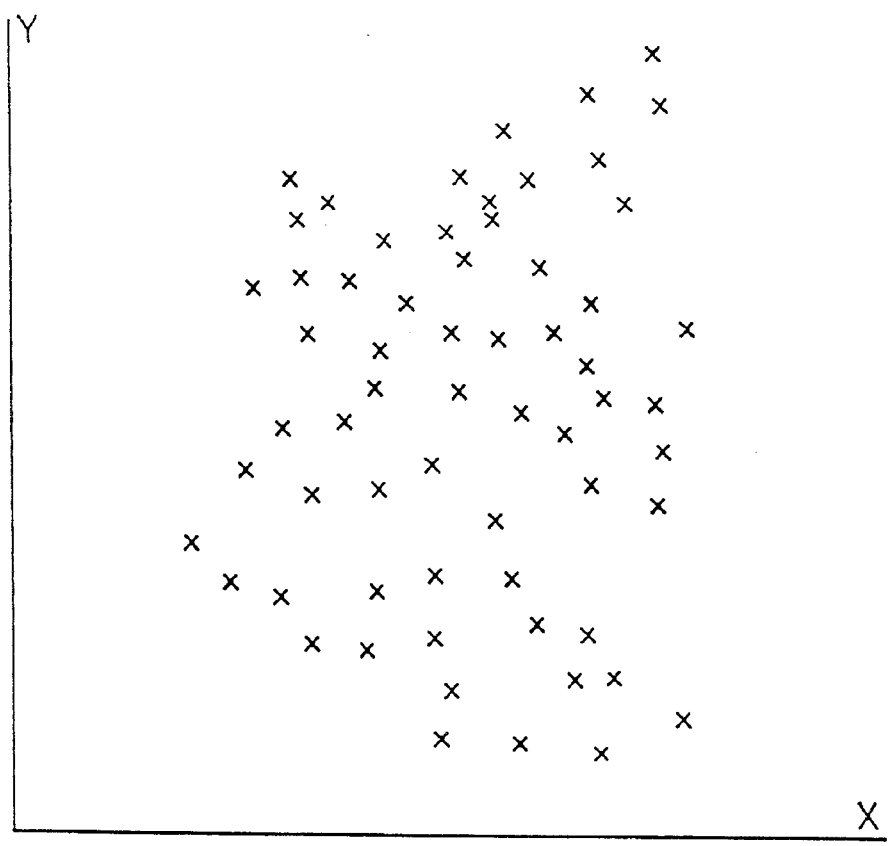
FIG. 3 shows how a class may be divided into local Gaussian distributions.
Figure 3:
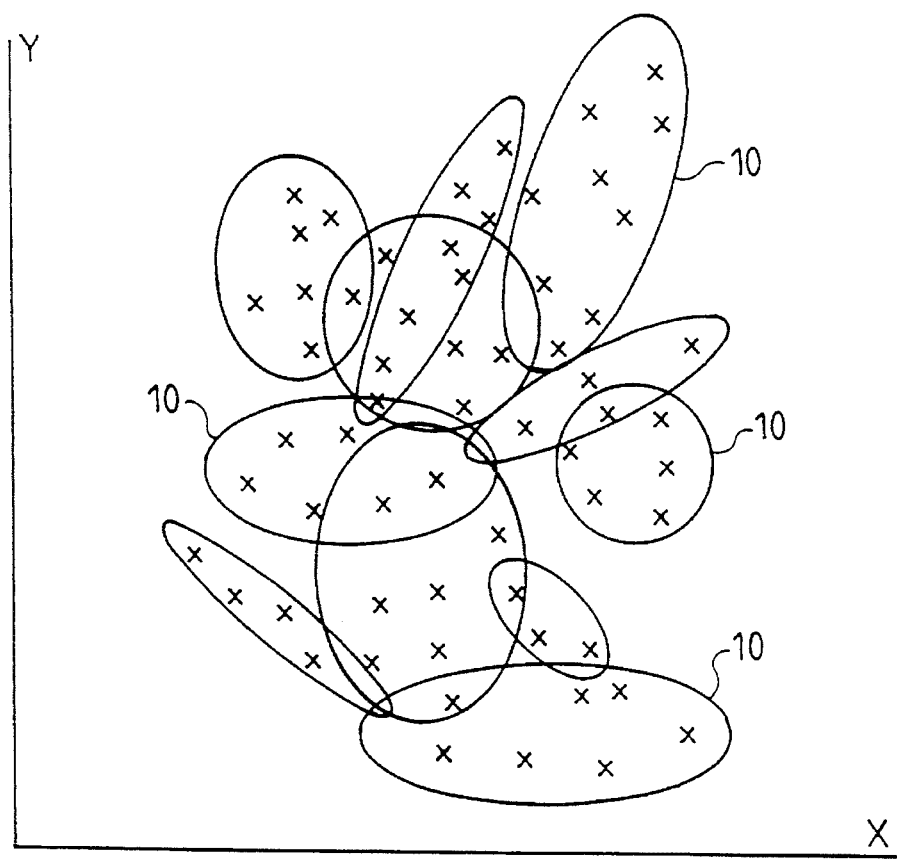
Figure 4:
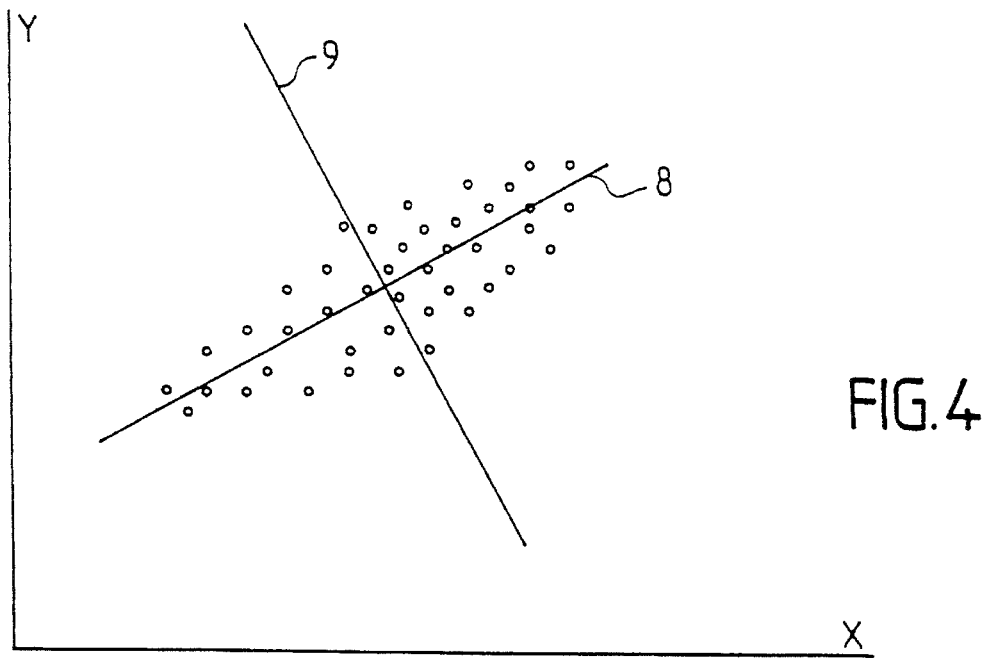
FIG. 4 shows the analysis of a local distribution according to its main distributions.

Since it is not easy to represent a vector having three dimensions, FIGS. 2 to 4 show points which each represent a vector in a two-dimensional plane, but it should be appreciated that these are symbols depicting vectors in a hyperspace having any number of dimensions, which number varies with the problem to be resolved. Each point in one of these Figures accordingly represents a vector, which in its turn represents the differences between the authentic specimen signatures.

The neural device considers data vectors which are present in a space of characteristics which may be subdivided into classes, one such space being illustrated in FIG. 2 where a cluster of points is visible forming part of a class indicated "CLASS 1", and another cluster of points forming part of another class indicated "CLASS 2". It is assumed that there are subjacent distributions in each class. FIG. 3 illustrates this, showing how it is possible to recognize groups of points in the lower diagram on the basis of the cluster of points illustrated in the upper diagram, each of these groups conforming to the same type of distribution as its neighbours. It is assumed that it is a valid approximation to consider the distributions as being Gaussian distributions.

To elucidate these ideas, let us suppose, for example, that there are ten authentic signatures available by way of specimens, i.e. ten vectors, each having three dimensions. For the moment, there is not yet a signature to be verified, first the device must be programmed. All the differences between the ten vectors taken two-by-two are calculated, which leads to forty-five differences, each being a three-dimensional vector. It is groups of the differences of this kind which are represented by the points in FIGS. 2 and 3. Subsequently, the fortyfour distances relative to the other points are calculated for each of the fortyfive points, and the k smallest ones are taken. The corresponding points form a set of points which are supposed to obey the same law of distribution. Each of these sets is symbolized by an ellipse in FIG. 3.

A few general aspects of statistics will now be discussed to render a more precise description of the algorithm used by the device more easy.

Suppose P(X) is the Gaussian probability that a set X belongs to the distribution centred around $\mu$, with the covariance matrix $\Gamma$:

$$P(X) = \frac{1}{\sqrt{(2\pi)^n} \sqrt{|\Gamma|}} \exp[-1/2 (X-\mu)^T \Gamma^{-1}(X-\mu)] \quad (1)$$

with:

$$P(X) = \frac{1}{\sqrt{(2\pi)^n}} \exp[1/2 \, L(X)]$$

and:

$$L(X) = -(X-\mu)^T \Gamma^{-1}(X-\mu) - \ln|\Gamma|$$

The exponent T indicates a transposed vector, and n is the dimension of the hyperspace.

The calculation of the terms of the equation (1) is possible when $\mu$ and $\Gamma$ are known.

It should be noted that the relation L(X) is quadratic. The condition ("de Bayes") for a set X to belong to such a distribution is that L(X)<S. This gives the equation of a hyperellipsoid in the space considered, L(X)<S being expressed by:

$$\sum_{ij} x_i a_{ij} x_j + \sum_i x_i b_i - c < S \quad (2)$$

The value of S is chosen by the user, it is may be considered as an indication of the volume of the hyperellipsoid.

The quadrature member 2 provided at the input of the neural network performs the following operation:

$$(x_1 \ldots x_n) \rightarrow (x_1, \ldots, x_n x_1 x_1, x_1 x_2, \ldots, x_1 x_n, x_2 x_2, \ldots, x_n x_n)$$

Those skilled in the art know how to realise physically such a quadrature member. The quadrature member accordingly replaces n terms by n+n(n+1)/2 terms each provided at an output. The n+n(n+1)/2 outputs of the quadrature member are each connected to one of the neurons of the first layer of "quadratic" neurons. Thus the terms $x_i x_j$ of the equation (2) are provided to the first neurons.

The coefficients $a_{ij}$, $b_i$ and c are determined through identification between the equations (1) and (2).

The calculation of L(X)−S, finally, requires the product "matrix x vector" of the output of the quadrature member by a specific matrix comprising the coefficients $a_{ij}$, $b_i$. It is known that a product "matrix x vector" may be realised by a layer in a neural network. Thus, the means for calculating L(X)−S are implanted in the second layer of hyperellipsoidal neurons 4. There are as many neurons 4 as there are differences between training specimens. The input of each of these neurons 4 is connected to outputs of the quadratic neurons 3, and the weights of the connections are equal to corresponding coefficients $a_{ij}$, $b_i$. The weights between the neuron 6 of fixed value "−1" and the neurons 4 are proportional to the difference L(X)−S defined above.

The non-linearity applied to L(X)−S by the presence of the quadrature member 2 smoothes the response of the layer of hyperellipsoids when X is close to the boundary of the hyperellipsoid represented by L(X)−S=0.

The output layer has the function of giving a response (probability that the signature provided at the input is authentic) as a function of the outputs of the internal neurons 4. One output neuron 5 is connected to all internal neurons 4 corresponding to training specimens of one and the same class, they thus constitute a group corresponding to this class. For example, in the case of verification of a signature, there would be two classes in principle, those of the counterfeit signatures and those of the authentic signatures, so two output neurons 5, one delivering a signal corresponding to the probability that the signature is counterfeit and the other to the probability that the signature is authentic. In practice, since there are generally no specimens of counterfeit signatures available, it is not possible to program the class of counterfeit signatures, and there is only one output neuron which gives the probability that the signature is authentic.

The output layer achieves an average of all the internal neurons of a group corrected by the output of neuron 7. The weights between the internal neurons 4 and the output neurons 5 are all fixed at ONE. The neuron 7 with fixed value "−1" renders it possible to take into account the cumulative balance of the cumulated output values of all the internal neurons 4 of one class, i.e. the sum of the output values of these neurons adjusted by their respective synaptic weights. A neuron in the output layer thus may be considered a kind of a counter of the number of the neurons in the hyperellipsoid layer whose values are high. The neuron in the output layer compares this number to the output value of the neuron 7. For this purpose, the synaptic weight between the neuron 7 and the output neuron of a given class is adjusted in the following manner: after the definition of the groups corresponding to the classes, the total number of training specimens is presented to the network (as in the case in which signatures are to be evaluated), and different weights between the neuron 7 and each output neuron are tried out in succession so as to find the respective weights which minimize the mean error for each class. This procedure may be carried out manually or it may be incorporated in the computerized means.

Training of the network accordingly consists in the estimation of each local law (one for each specimen of the programming base) and in the calculation of the synaptic weights. An adaptive solution is used for the calculation of the local distribution: regions are sought according to a Euclidian metric system and these regions are constructed in such a manner that they contain a fixed number of differences between training instead of imposing on them a topological definition, as would be the natural course. In other words, instead of dividing the space into arbitrary regions delimited by fixed frontiers, the definition of a region is a surface containing a given number of differences between training specimens.

The incremental programming of the network (as defined in the introduction) involves the addition of a new neuron 4 for each new difference, and possibly of a new output neuron 5 if there is a new class (in case there is a plurality of classes).

The following operations are carded out for each underlying class $C_m$ during learning based:

\*\*\* for each signature B belonging to $C_m$:

\* calculation of how near the features of B are to the training specimens of the class $C_m$. This region is determined by means of the algorithm of the "k nearest neighbours":

1/calculation of the distances between each of the differences between training specimens of ass $C_m$ and the features of signature B, 2/classification of these distances according to their length, 3/the k nearest neighbours are those points of $C_m$ which give the k smallest distances.

\* calculation of the statistical characteristics of the local distribution: $\Gamma$ (covariance matrix of the normal distribution of which k samples are the k neighbours) and $\mu$ (centroid of the distribution).

\* calculation of the main axes of the distribution (see FIG. 4, which gives an example in a plane with two main axes 8 and 9, but in reality there are as many axes as there are dimensions). To this end, a "main components" anaylsis is carried out. This known method directly yields the characteristic vectors of the covariance matrix of the distribution. The characteristic vectors give the directions of the main axes. In the description of the covariance matrix in the base defined by its main axes, the approximation is adopted that this matrix is diagonal.

\* calculation of the weights between the output of the quadrature member and the hyperellipsoidal neurons corresponding to the signature B. This step realises the calculation of the coefficients $a_{ij}$ and $b_i$.

\* calculation of c.

\* setting the synaptic weight between the hyperellipsoidal neurons corresponding to all differences between the training specimens of $C_m$ and the output neuron of the class $C_m$ for ONE.

\* incrementing $N_m$ ($N_m$ is the number of hyperellipsoidal neurons created so far, i.e. the number of differences between training specimens taken into account).

\*\*\* if an automatic determination of the synaptic weights between the neuron 7 and the output neurons is desired:

\* calculation of the "cumulative balance" defined above corresponding to the class $C_m$ for each signature B belonging to $C_m$ and for the integer values of the weight in the series $[-N_m, \ldots, +N_m]$. Calculation of the error in the output value of the class $C_m$.

\*\*\* conservation of the weight value which minimizes the mean error for class $C_m$.

Figure 5:
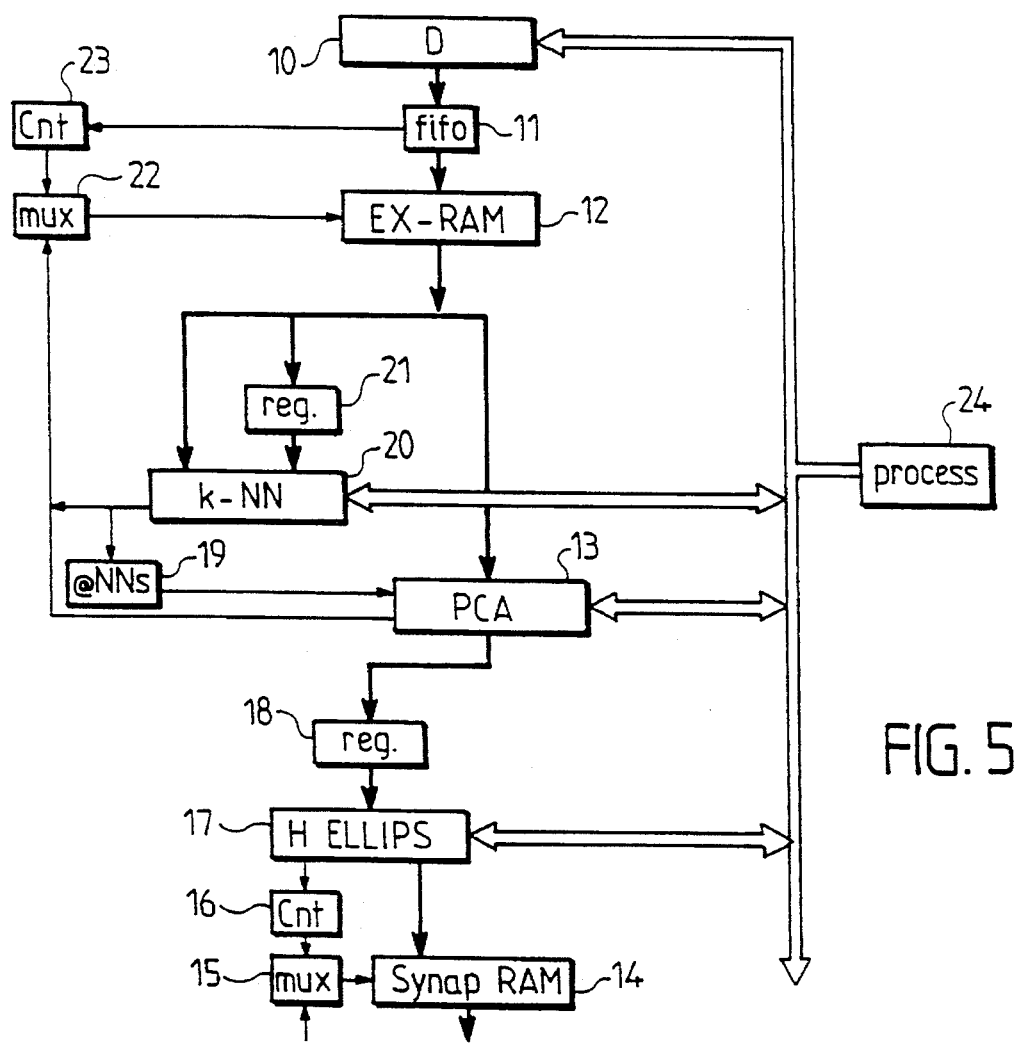
FIG. 5 shows a diagram of the steps taken for establishing the synaptic values.

The flow chart of FIG. 5 illustrates the calculation of the hyperellipsoids. The material necessary for realising this can be easily derived therefrom: it is visible that four functional modules are necessary:

a random-access memory 12 marked "Ex-RAM" is loaded with the available differences between training specimens from a main memory 10 in which all available data are stored through a buffer memory 11.

\* the module 20 marked "k-NN" loads a training specimen from a register 21, carries out the search for its k nearest neighhours and memorizes their k addresses in a register 19.

\* the module 13 marked "PCA" analyses the k nearest neighhours for their main components and calculates the statistical parameters. The coordinates of the main axes, the product of the terms of the diagonal of the covariance matrix and the centroid of the local distribution are then held in a register 18.

\* the module 17 marked "H ELLIPS" calculates the synaptic weights and stores them in a random-access memory 14 marked "synap RAM".

\* the central processor 24 marked "process" controls the communications and the performance of the functions. It first of all controls the loading of a databank of differences between training specimens in the random-access memory 12, then it fills the pipeline (k-NN, PCA, H ELLIPS) and it discharges the latter when all hyperellipsoids have been calculated.

A counter 23 registers the number of differences between training specimens loaded into the memory 12, and a multiplexer 22 enables module 13 to access the differences between training specimens directly.

A counter 16 registers the number of classes and the number of neurons created, which are supplied to the memory 14 by the module 17, and a multiplexer 15 enables the user to access the synaptic weights in the memory 14 directly, so that they can be read there and applied to the neural network.

The method specified above permits learning of a class of signatures (those of a predetermined person and comprising, e.g., twelve specimens) typically within milliseconds, whereas the known iterative method requires considerably more time, typically hours.

Once the learning of a class of signatures of a single person has been terminated, it will suffice to retrieve the values for the synaptic coefficients each time that the person's current signature is to be authenticated. These values may be stored, for instance, on a memory card issued to the person. Upon introducing the card and an actual signature into the system, the authentification procedure is started.

We claim:

1. A method for training a neural network to classify an unknown signal of a known type, comprising the steps of:

a) selecting at least one feature from each of a plurality of known signals having at least one feature;

b) determining a difference between the selected at least one feature for every different pair of known signals wherein the differences are represented by a plurality of difference-vectors;

c) selecting a first one of the differences vectors as a current difference-vector and determining the k nearest difference-vectors from said current difference-vector wherein a decision domain is created including a group of k+1 difference-vectors;

d) calculating a distribution probability for the group of difference-vectors in the decision domain;

e) introducing a neuron corresponding to the decision domain into an internal layer of neurons of the neural network;

f) calculating a weight represented by $a_{ij}$ and a weight represented by $b_i$ for each difference-vector connection between an input layer of neurons and the internal layer based upon the distribution probability of the decision domain; and g) selecting a next one of the difference-vectors as a new current difference-vector and repeating steps (c) through (g) until the last difference-vector is processed, and h) inputting a plurality of unknown signal difference-vectors into an input layer of the network and calculating a probability based upon the weighting coefficients $a_{ij}$ and $b_i$ that the unknown signal difference-vectors lie within one of the decision domains, whereby the neural network is trained to classify the differences between the unknown signal and the known signals thus indicating the degree of correspondence between the unknown signal and the known signals.

2. The method of claim 1 wherein the step of selecting a first one of the differences vectors as a current difference-vector and determining the k nearest difference-vectors from said current difference-vector wherein a decision domain is created including a group of k+1 difference-vectors in conjunction with the step of repeating steps (c) through (g) until the last difference-vector is processed comprises creating a plurality of decision domains each having the same k+1, fixed number of difference-vectors.

3. The method of claim 1 comprising the step of adding a neuron to an output layer of the neural network wherein each output layer neuron corresponds to a class comprising a group of internal layer neurons.

4. The method of claim 1 wherein the step of calculating a distribution probability for each of the decision domains comprises determining a covariance matrix of the k closest neighbors, a centroid of the distribution and principal axes of an ellipsoid representing each decision domain.

5. The method of claim 4 wherein the weights are represented in the equation $$\Sigma_{ij} x_i a_{ij} x_j + \Sigma_i x_i b_i - c < S$$

wherein S is a previously determined coefficient that expresses a volume of the decision domain under consideration and $a_{ij}$, $b_i$ and c are determined through identification between the equation and the relation $$L(X) = -(X-\mu)^T \Gamma^{-1}(X-\mu) - \ln|\Gamma|$$

where $\mu$ is the centroid of the distribution, $\Gamma$ is the covariance matrix of the distribution, X is a vector of coordinates of the unknown signal, L(X) is defined by L(X)<S, and T is a mathematical operator meaning that $(X-\mu)$ is a transposed vector.

6. The method of claim 4 further comprising the step of providing data to the neural network by transforming n input terms into n+n(n+1)/2 output terms representing $x_i$, $x_j$ at an input to the neural network and connecting each of the output terms to a corresponding neuron in the input layer of neurons in the neural network.

7. The method of claim 1 wherein the unknown signals are signatures including authentic and forged signatures and the known signals are correct signatures.

* * * * *